United States Patent
Delett

(10) Patent No.: US 7,083,367 B2
(45) Date of Patent: Aug. 1, 2006

(54) ADAPTOR DEVICE FOR HOLDING A BLADE

(76) Inventor: Gene Delett, 5330 East Rockton Rd., S. Beloit, IL (US) 61080-0038

( * ) Notice: Subject to any disclaimer, the term of this patent is extended or adjusted under 35 U.S.C. 154(b) by 197 days.

(21) Appl. No.: 10/689,153

(22) Filed: Oct. 20, 2003

(65) Prior Publication Data
US 2005/0084343 A1 Apr. 21, 2005

(51) Int. Cl.
B23B 51/06 (2006.01)
(52) U.S. Cl. .................. 408/59; 408/226; 408/233; 408/713
(58) Field of Classification Search ............... 408/226, 408/227, 229, 230, 231, 232, 233, 713, 57, 408/59
See application file for complete search history.

(56) References Cited

U.S. PATENT DOCUMENTS

| | | | | |
|---|---|---|---|---|
| 1,746,716 A | * | 2/1930 | Sasse | 408/59 |
| 3,085,453 A | * | 4/1963 | Mossberg | 76/108.1 |
| 4,493,596 A | * | 1/1985 | Grunsky et al. | 408/233 |
| 4,511,294 A | * | 4/1985 | Grunsky et al. | 408/232 |
| 4,642,001 A | * | 2/1987 | Gill et al. | 408/59 |
| 5,399,051 A | * | 3/1995 | Aken et al. | 408/233 |
| 5,425,604 A | * | 6/1995 | Scheer et al. | 408/83 |
| 5,452,971 A | * | 9/1995 | Nevills | 408/230 |
| 5,474,407 A | * | 12/1995 | Rodel et al. | 408/227 |
| 5,957,635 A | * | 9/1999 | Nuzzi et al. | 408/231 |
| 6,012,881 A | * | 1/2000 | Scheer | 408/227 |
| 6,109,841 A | * | 8/2000 | Johne | 408/144 |
| 2003/0219321 A1 | * | 11/2003 | Borschert et al. | 408/230 |

FOREIGN PATENT DOCUMENTS

| | | | |
|---|---|---|---|
| DE | 2654400 | * | 6/1978 |
| DE | 3616230 | * | 11/1987 |
| JP | 2000-158220 | * | 6/2000 |
| JP | 2003-56270 | * | 2/2003 |
| WO | 01/36135 | * | 5/2001 |

* cited by examiner

Primary Examiner—Daniel W. Howell
(74) Attorney, Agent, or Firm—David J. Archer

(57) ABSTRACT

An adapter device is disclosed for holding a blade having a first and a second side onto a distal end of a holder of a spade drill. The adapter device includes a body of generally cylindrical configuration, the body having a first and a second extremity. The body defines a first flute and a second flute which is disposed diametrically opposite to the first flute. The body also defines a bore which extends from the second extremity of the body for the flow therethrough of coolant. Additionally, the body defines a first and a second branch bore, the branch bores extending from the bore to the first extremity of the body. The second extremity of the adapter removably cooperates with the distal end of the holder and the first extremity of the body defines a diametrical slot disposed between the flutes. The slot is for the replaceable reception therein of the blade such that coolant flowing through the first branch bore is directed towards the first side of the blade and coolant flowing through the second branch bore is directed towards the second side of the blade.

12 Claims, 7 Drawing Sheets

ADAPTOR DEVICE FOR HOLDING A BLADE

BACKGROUND OF THE INVENTION

1. Field of the Invention

The present invention relates to an adapter device for holding a blade having a first and a second side onto a distal end of a holder of a spade drill. More particularly, the present invention relates to an adapter device for the passage therethrough of coolant, the device permitting holding a blade having a first and a second side onto a distal end of a holder of a spade drill.

2. Background Invention

Spade drills are used in machine tools for boring relatively large diameter holes in a workpiece and for generating various configurations at the base of the drilled bore.

Typically, a spade drill includes a holder which is removably secured to the turning mechanism of the machine tool. The distal end or working end of the holder includes a drill point and cutting edges extending generally radially from the drill point so that as the holder rotates, the cutting edges guided by the drill point progressively bore through the workpiece.

However, such cutting edges may break or become subjected to excessive wear. Accordingly, the entire spade drill must be replaced thus requiring resetting of the machine tool in order to achieve the required tolerances. Accordingly, spade drills have been proposed in which the cutting edges are replaced by removable inserts. Such an arrangement is disclosed in U.S. Pat. No. 4,642,001 to Hunter et al.

As taught in the U.S. Pat. No. 4,642,001, a carrier block supported by the holder has a first and a second insert with each insert having four cutting edges so that any of the four cutting edges can be positioned to do the cutting.

The present invention provides a unique arrangement for locating a single blade having two cutting edges within an adapter which may be rapidly secured to the distal end of a holder. The arrangement is such that the adapter device and blade can be readily replaced by another adapter device having the same size blade or a different sized blade without any need for resetting the machine tool.

Therefore, it is a primary feature of the present invention to provide an adapter device for a spade drill that overcomes the problems associated with the prior art arrangements.

Another feature of the present invention is the provision of an adapter device for a spade drill that facilitates the changing of a blade.

A further feature of the present invention is the provision of an adapter device for a spade drill that permits the use of a variety of blades without any need for resetting a machine tool.

Another feature of the present invention is the provision of an adapter device for a spade drill that avoids the need for replacing an entire spade drill when a blade thereof becomes worn or broken.

Other features and advantages of the present invention will be readily apparent to those skilled in the art by a consideration of the detailed description of a preferred embodiment of the present invention contained herein.

SUMMARY OF THE INVENTION

The present invention relates to an adapter device for holding a blade having a first and a second side onto a distal end of a holder of a spade drill. The adapter device includes a body of generally cylindrical configuration, the body having a first and a second extremity. The body defines a first flute and a second flute which is disposed diametrically opposite to the first flute. The body also defines a bore which extends from the second extremity of the body for the flow therethrough of coolant. Additionally, the body defines a first and a second branch bore, the branch bores extending from the bore to the first extremity of the body. The second extremity of the adapter removably cooperates with the distal end of the holder and the first extremity of the body defines a diametrical slot disposed between the flutes. The slot is for the replaceable reception therein of the blade such that coolant flowing through the first branch bore is directed towards the first side of the blade and coolant flowing through the second branch bore is directed towards the second side of the blade.

In a more specific embodiment of the present invention, the body is fabricated from steel.

Also, the first flute permits the flow therethrough of coolant flowing from the first branch bore past the first side of the blade towards the holder.

Additionally, the second flute permits the flow therethrough of coolant flowing from the second branch bore past the second side of the blade towards the holder.

The flutes extend from the first extremity to the second extremity of the body.

Moreover, the bore has a first and a second termination, the second termination being disposed adjacent to the second extremity of the body.

Furthermore, the first branch bore has a first and a second end, the second end of the first branch bore extending from the first termination of the bore. Also, the first end of the first branch bore is disposed adjacent to the first extremity of the body. Additionally, the second branch bore has a first and a second extremity, the second extremity of the second branch bore extending from the first termination of the bore, the first extremity of the second branch bore being disposed adjacent to the first extremity of the body.

Also, the second extremity of the body defines a diametrically extending ridge for the removable reception thereof within a cooperating channel defined by the distal end of the holder such that in use of the adapter device, when the holder is rotated, the ridge and the channel cooperate to drive the body and the blade secured thereto.

In a preferred embodiment of the present invention, the body includes an extension which extends away from the second extremity of the body, the extension being removably fastened to the holder.

More specifically, the diametrical slot has a base having a first and a second end, the slot having a first and a second wall. The first wall defines a first threaded bore and a fastener extends through the blade and threadably cooperates with the first threaded bore for removably securing the blade within the slot. Similarly, the second wall defines a second threaded bore and a further fastener extends through the blade and threadably cooperates with the second threaded bore for removably securing the blade within the slot.

Additionally, the body further includes a stud which is disposed between the first and second ends of the base, the stud extending into a recess defined by the blade for locating the blade relative to the adapter device.

Moreover, the first extremity of the body defines a first surface where the first branch bore terminates. Also, the first extremity of the body defines a second surface where the second branch bore terminates.

In another aspect of the present invention, a spade drill includes a holder having a distal end and an adapter device which includes a body of generally cylindrical configuration. The body has a first and a second extremity, the body defining a first flute and a second flute disposed diametrically opposite to the first flute. The body also defines a bore which extends from the second extremity of the body for the flow therethrough of coolant. The body further defines a first and a second branch bore. The branch bores extend from the bore to the first extremity of the body. The second extremity of the adapter removably cooperates with the distal end of the holder. A blade having a first and a second side is removably secured to the first extremity of the body. The first extremity of the body defines a diametrical slot which is disposed between the flutes for the replaceable reception therein of the blade such that coolant flowing through the first branch bore is directed towards the first side of the blade and coolant flowing through the second branch bore is directed towards the second side of the blade.

More specifically, the distal end of the holder defines a channel and the second extremity of the body defines a diametrically extending ridge for the removable reception thereof within the channel defined by the distal end of the holder. The arrangement is such that in use of the adapter device, when the holder is rotated, the ridge and the channel cooperate to drive the body and the blade secured thereto.

The body includes an extension of truncated conical configuration, the extension extending away from the ridge. A bore extends from the channel for the removable reception therein of the extension. A locking fastener is adjustably movable through the holder towards the truncated conical extension such that when the locking fastener is disposed in a locking disposition thereof, the extension is locked within the bore so that the adapter device is secured to the distal end of the holder.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings

DETAILED DESCRIPTION OF THE DRAWINGS

Figure 1:
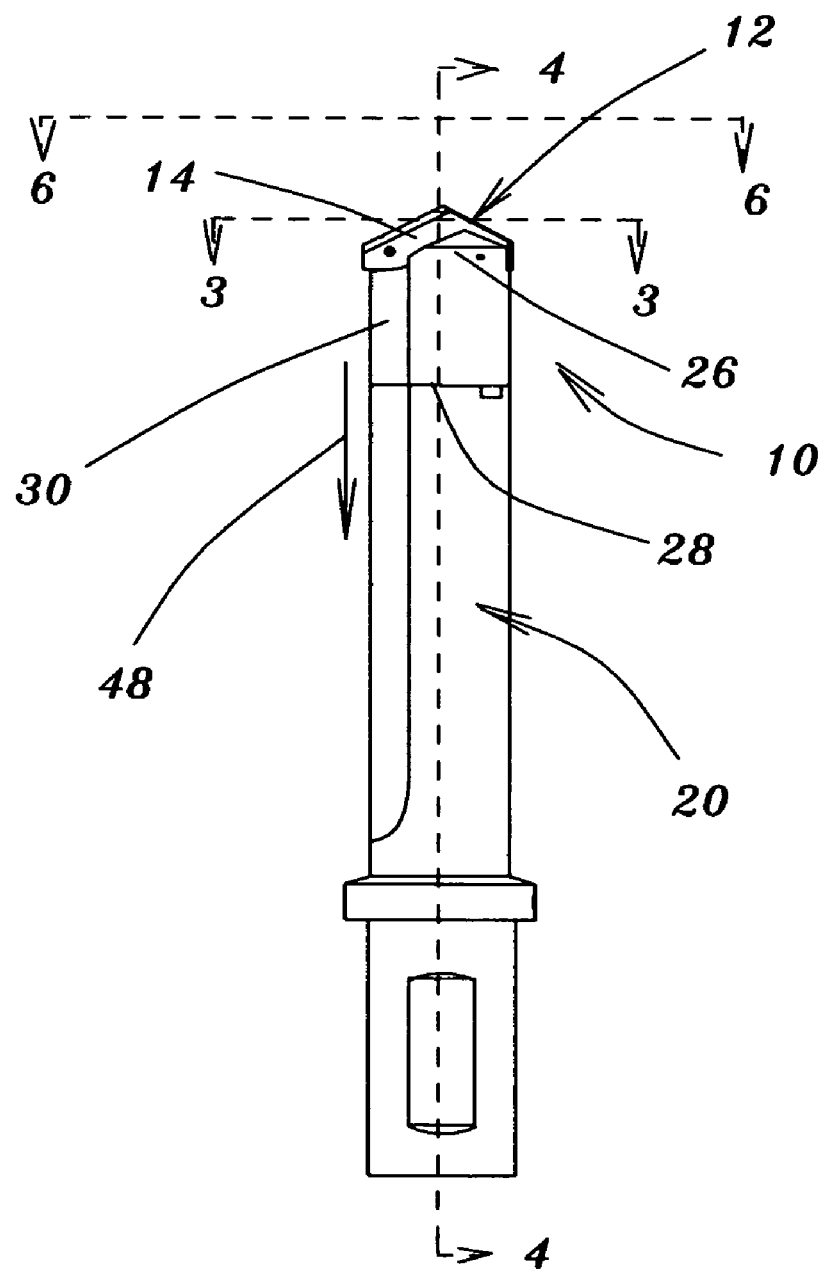
FIG. 1 is a side elevational view of an adapter device according to the present invention.

FIG. 1. is a side elevational view of an adapter device generally designated 10 according to the present invention. As shown in FIG. 1, the adapter device 10 is for holding a blade generally designated 12 having a first side 14.

Figure 2:
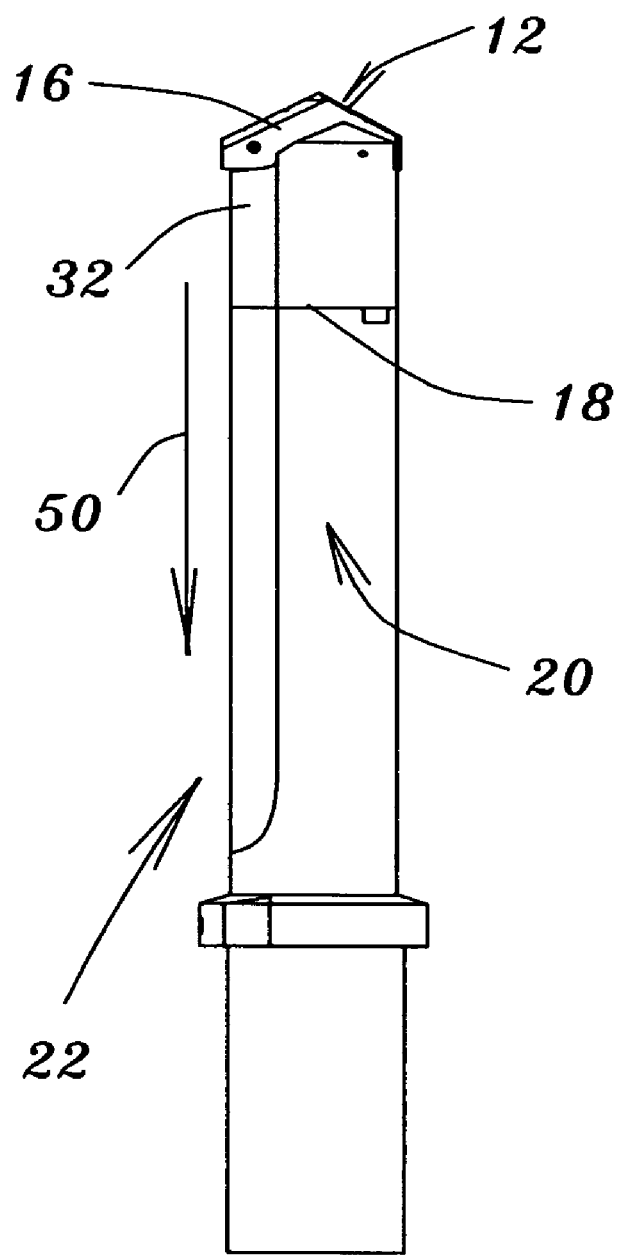
FIG. 2 is a similar view to that shown in FIG. 1 but viewed from the opposite side.

FIG. 2 is a similar view to that shown in FIG. 1 but viewed from the opposite side. As shown in FIG. 2, the blade 12 has a second side 16. The blade 12 is held relative to a distal end 18 of a holder generally designated 20 of a spade drill generally designated 22 which includes the holder 20, the adapter device 10 and the blade 12.

Figure 3:
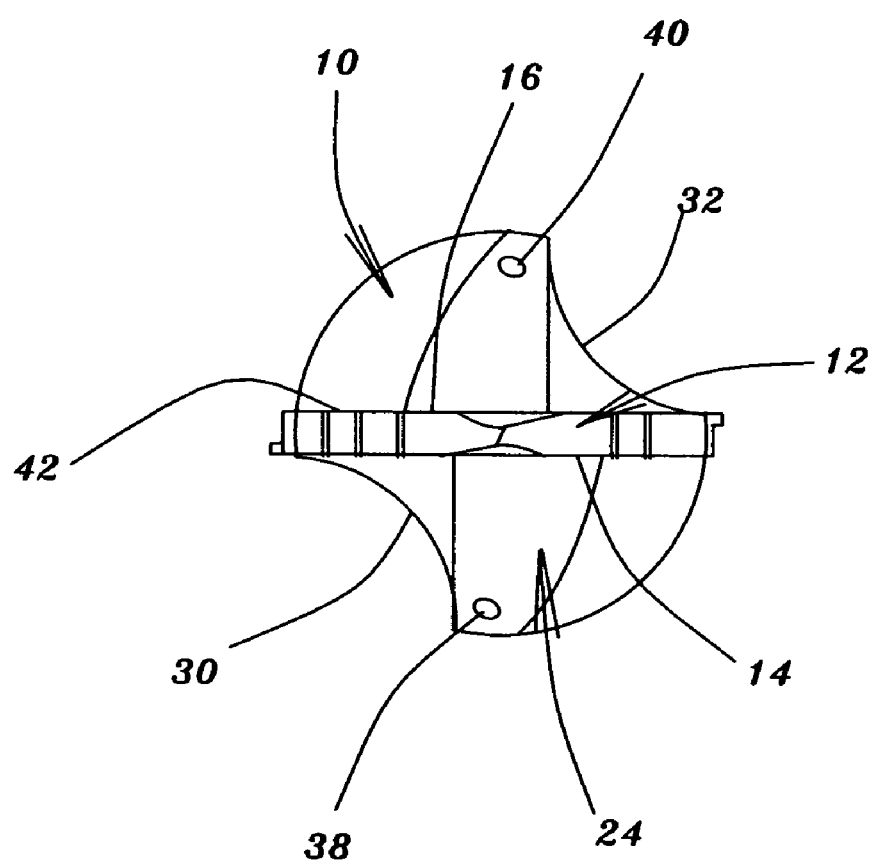
FIG. 3 is an enlarged view taken on the line 3—3 of FIG. 1.

FIG. 3 is an enlarged view taken on the line 3—3 of FIG. 1. As shown in FIG. 3, the adapter device 10 includes a body generally designated 24 of generally cylindrical configuration, the body 24 having a first and a second extremity 26 and 28 respectively as shown in FIG. 1. As shown in FIG. 3, the body 24 defines a first flute 30 and a second flute 32 which is disposed diametrically opposite to the first flute 30.

Figure 4:
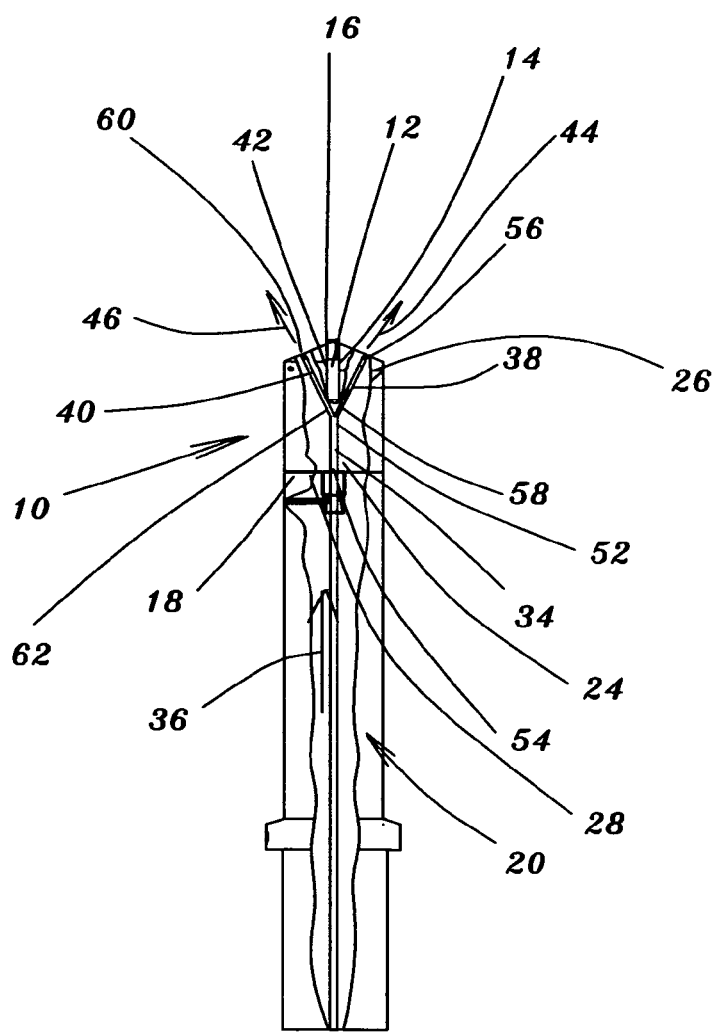
FIG. 4 is a view partially taken on the line 4—4 of FIG. 1.

FIG. 4 is a view partially taken on the line 4—4 of FIG. 1. As shown in FIG. 4, the body 24 also defines a bore 34 which extends from the second extremity 28 of the body 24 for the flow therethrough of coolant as indicated by the arrow 36. Additionally, the body 24 defines a first and a second branch bore 38 and 40 respectively, the branch bores 38 and 40 extending from the bore 34 to the first extremity 26 of the body 24. The second extremity 28 of the adapter device 10 removably cooperates with the distal end 18 of the holder 20 and the first extremity 26 of the body 24 defines a diametrical slot 42 disposed between the flutes 30 and 32 as shown in FIG. 3. As shown in FIGS. 3 and 4, the slot 42 is for the replaceable reception therein of the blade 12 such that coolant flowing through the first branch bore 38 as indicated by the arrow 44 is directed towards the first side 14 of the blade 12 and coolant flowing through the second branch bore 40 as indicated by the arrow 46 is directed towards the second side 16 of the blade 12.

In a more specific embodiment of the present invention, the body is fabricated from steel.

Also, as shown in FIG. 1, the first flute 30 permits the flow therethrough as indicated by the arrow 48 of coolant flowing from the first branch bore 38 past the first side 14 of the blade 12 towards the holder 20.

Additionally, as shown in FIG. 2, the second flute 32 permits the flow therethrough as indicated by the arrow 50 of coolant flowing from the second branch bore 40 past the second side 16 of the blade 12 towards the holder 20.

The first flute 30 extends from the first extremity 26 to the second extremity 28 of the body 24 and the second flute 32 extends from the first extremity 26 to the second extremity 28 of the body 24.

Moreover, as shown in FIG. 4, the bore 34 has a first and a second termination 52 and 54 respectively, the second termination 54 being disposed adjacent to the second extremity 28 of the body 24.

Furthermore, the first branch bore 38 has a first and a second end 56 and 58 respectively, the second end 58 of the first branch bore 38 extending from the first termination 52 of the bore 34. Also, the first end 56 of the first branch bore 38 is disposed adjacent to the first extremity 26 of the body 24. Additionally, the second branch bore 40 has a first and a second extremity 60 and 62 respectively, the second extremity 62 of the second branch bore 40 extending from the first termination 52 of the bore 34, the first extremity 60 of the second branch bore 40 being disposed adjacent to the first extremity 26 of the body 24.

Figure 5:
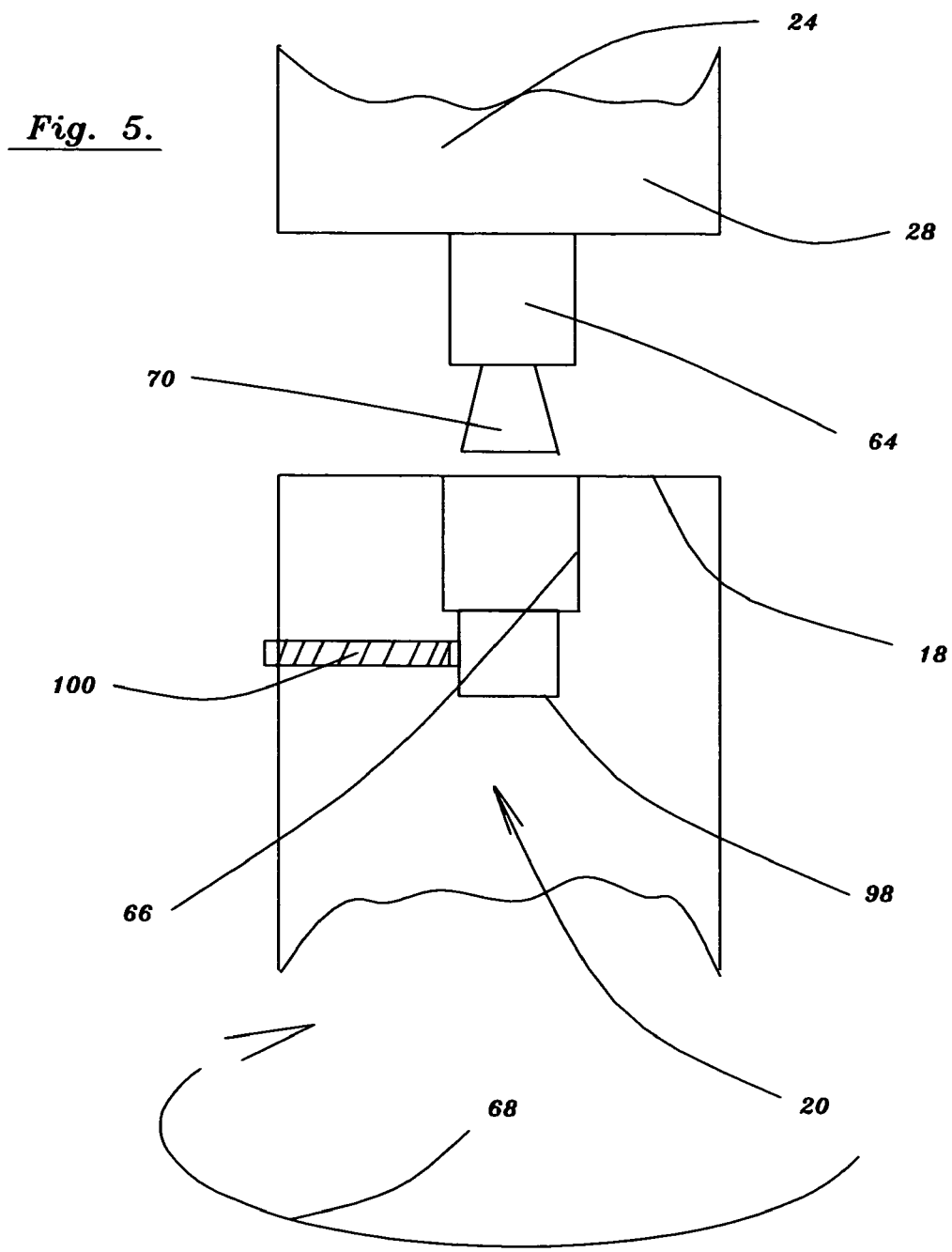
FIG. 5 is an enlarged fragmentary side elevational view of the holder before the adapter device secured thereto.

FIG. 5 is an enlarged fragmentary side elevational view of the holder 20 before the adapter device 10 is secured thereto. As shown in FIG. 5, the second extremity 28 of the body 24 defines a diametrically extending ridge 64 for the removable reception thereof within a cooperating channel 66 defined by the distal end 18 of the holder 20 such that in use of the adapter device 10, when the holder 20 is rotated as indicated by the arrow 68, the ridge 64 and the channel 66 cooperate to drive the body 24 and the blade 12 secured thereto.

In a preferred embodiment of the present invention, the body 24 includes an extension 70 which extends away from the second extremity 28 of the body 24, the extension 70 being removably fastened to the holder 20.

Figure 6:
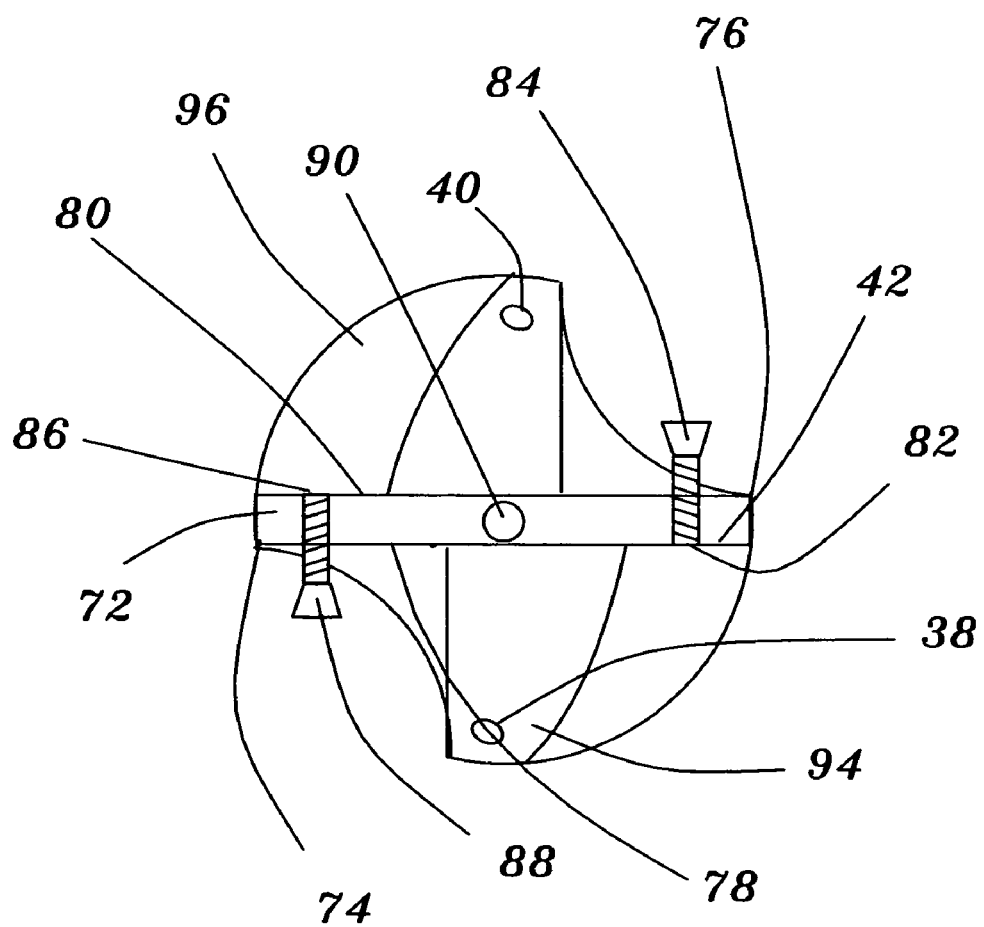
FIG. 6 is an enlarged view taken on the line 6—6 of FIG. 1 but with the blade removed.

FIG. 6 is an enlarged view taken on the line 6—6 of FIG. 1 but with the blade 12 removed. As shown in FIG. 6, the diametrical slot 42 has a base 72 having a first and a second end 74 and 76 respectively, the slot 42 having a first and a second wall 78 and 80. The first wall 78 defines a first threaded bore 82 and a fastener 84 such as a threaded bolt extends through a hole in the blade 12 and threadably cooperates with the first threaded bore 82 for removably securing the blade 12 within the slot 42. Similarly, the second wall 80 defines a second threaded bore 86 and a further fastener 88 such as a threaded bolt extends through a further hole of the blade 12 and threadably cooperates with the second threaded bore 86 for removably securing the blade 12 within the slot 42.

Additionally, the body 24 further includes a stud 90 which is disposed between the first and second ends 74 and 76 respectively of the base 72.

Figure 7:
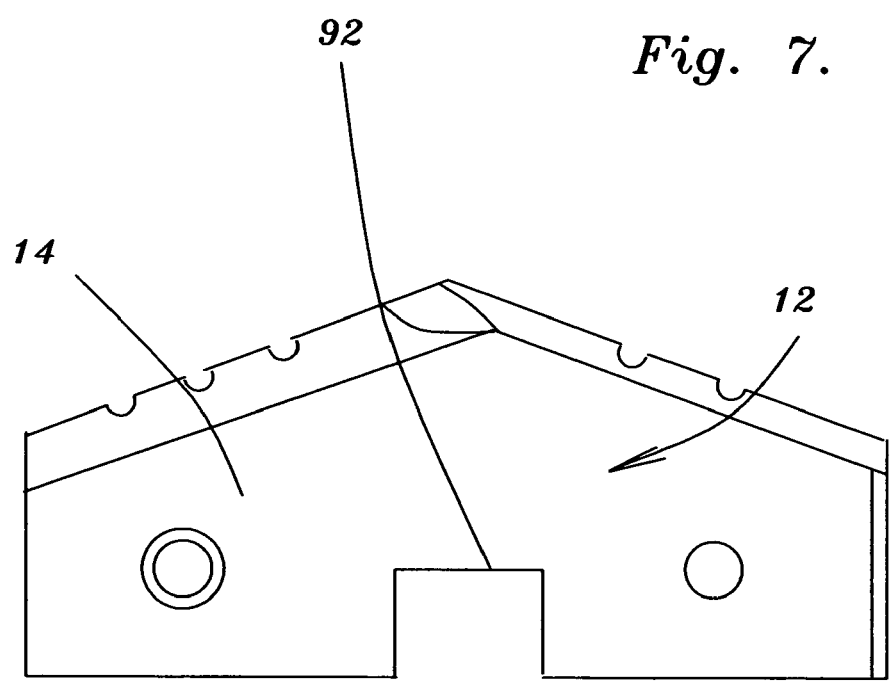
FIG. 7 is a side elevational view of the blade.

FIG. 7 is a side elevational view of the blade 12. As shown in FIG. 7, the stud 90 extends into a recess 92 defined by the blade 12 for locating the blade 12 relative to the adapter device 10.

Moreover, as shown in FIG. 6, the first extremity 26 of the body 24 defines a first surface 94 where the first branch bore 38 terminates. Also, the first extremity 26 of the body 24 defines a second surface 96 where the second branch bore 40 terminates.

In another aspect of the present invention, as shown in FIGS. 1–7, a spade drill 22 includes a holder 20 having a distal end 18 and an adapter device 10 includes a body 24 of generally cylindrical configuration, the body 24 having a first and a second extremity 26 and 28 respectively. The body defines a first flute 30 and a second flute 32 which is disposed diametrically opposite to the first flute 30, the body 24 also defining a bore 34 which extends from the second extremity 28 of the body 24 for the flow therethrough of coolant. The body 24 further defines a first and a second branch bore 38 and 40 respectively, the branch bores 38 and 40 extending from the bore 34 to the first extremity 26 of the body 24. The second extremity 28 of the adapter device 10 removably cooperates with the distal end 18 of the holder 20. A blade 12 having a first and a second side 14 and 16 respectively is removably secured to the first extremity 26 of the body 24. The first extremity 26 of the body 24 defines a diametrical slot 42 which is disposed between the flutes 30 and 32 for the replaceable reception therein of the blade 12 such that coolant flowing through the first branch bore 38 as indicated by the arrow 44 is directed towards the first side 14 of the blade 12 and coolant flowing through the second branch bore 40 as indicated by the arrow 46 is directed towards the second side 16 of the blade 12.

More specifically, the distal end 18 of the holder 20 defines a channel 66 and the second extremity 28 of the body 24 defines a diametrically extending ridge 64 for the removable reception thereof within the channel 66 defined by the distal end 18 of the holder 20. The arrangement is such that in use of the spade drill 22, when the holder 20 is rotated, the ridge 64 and the channel 66 cooperate to drive the body 24 and the blade 12 secured thereto.

As shown in FIG. 5, the body 24 includes an extension 70 of truncated conical configuration, the extension 70 extending away from the ridge 64. A chamber 98 extends from the channel 66 for the removable reception therein of the extension 70. A locking fastener 100 is movable laterally through a threaded bore defined by the holder 20 towards the truncated conical extension 70 such that when the locking fastener 100 is disposed in a locking disposition thereof, the extension 70 is locked within the chamber 98 so that the adapter device 10 is secured to the distal end 18 of the holder 20.

In operation of the adapter device according to the present invention, the machine tool (not shown) is set in order to perform a required drilling operation on a workpiece (not shown). The blade 12 is then fastened to the adapter device 10 by means of the fasteners 84 and 88 with the stud 90 located within the recess 92 of the blade 12. The combined adapter device 10 and blade 12 are then secured to the distal end 18 of the holder 20 with the ridge 64 located within the channel. 66. The locking fastener 100 is then tightened to lock the conical shaped extension 70 within the chamber 98. Several adapters are provided with different size blades secured thereto so that when a different drilling operation is to be performed on the workpiece, all that is required is the loosening of the locking fastener 100 and the replacement of the adapter device 10 and attached blade 12 with a replacement combined adapter device and blade without any need for resetting the machine tool.

Also, several different types of holders may be provided according to the present invention such holders having different lengths and diameters. The holders may include straight flutes as shown in the drawings or may include helical fluting.

Additionally, the present invention includes deflectors that will redirect the flow of coolant from the branch bores directly onto the cutting edges of the blade.

The present invention provides a unique adapter device for securing a blade of a spade drill relative to a holder.

What is claimed is:

1. An adapter device for holding a blade having a first and a second side onto a distal end of a holder of a spade drill, said adapter comprising:

a body of generally cylindrical configuration, said body having a first and a second extremity, said body defining a first flute and a second flute disposed diametrically opposite to said first flute, said body also defining a bore which extends from said second extremity of said body for the flow therethrough of coolant, said body further defining a first and a second branch bore, said branch bores extending from said bore to said first extremity of said body;

said second extremity of said adapter removably cooperating with the distal end of the holder;

said first extremity of said body defining a diametrical slot disposed between said flutes for the replaceable reception therein of the blade such that coolant flowing through said first branch bore is directed towards the first side of the blade and coolant flowing through said second branch bore is directed towards said second side of the blade;

said second extremity of said body defines a diametrically extending ridge;

an extension extending away from said ridge;

the distal end of the holder defining a channel and a chamber for the removable reception therein of said ridge and said extension respectively; and a fastener for fastening said extension within said chamber such that in use of said adapter device, when the holder is rotated, said ridge and said channel cooperate with each other to drive said body and the blade secured thereto.

2. An adapter device as set forth in claim 1 wherein said body is fabricated from steel.

3. An adapter device as set forth in claim 1 wherein said first flute permits the flow therethrough of coolant flowing from said first branch bore past the first side of the blade towards the holder;

said second flute permits the flow therethrough of coolant flowing from said second branch bore past the second side of the blade towards the holder.

4. An adapter device as set forth in claim 1 wherein said first flute extends from said first extremity to said second extremity of said body;

said second flute extends from said first extremity to said second extremity of said body.

5. An adapter device as set forth in claim 1 wherein said bore has a first and a second termination, said second termination being disposed adjacent to said second extremity of said body.

6. An adapter device as set forth in claim 5 wherein said first branch bore has a first and a second end, said second end of said first branch bore extending from said first termination of said bore, said first end of said first branch bore being disposed adjacent to said first extremity of said body;

said second branch bore has a first and a second extremity, said second extremity of said second branch bore extending from said first termination of said bore, said first extremity of said second branch bore being disposed adjacent to said first extremity of said body.

7. A spade drill apparatus comprising:
a holder having a distal end;
an adapter device including;
a body of generally cylindrical configuration, said body having a first and a second extremity, said body defining a first flute and a second flute disposed diametrically opposite to said first flute, said body also defining a bore which extends from said second extremity of said body for the flow therethrough of coolant, said body further defining a first and a second branch bore, said branch bores extending from said bore to said first extremity of said body;
said second extremity of said adapter device removably cooperating with said distal end of said holder;
a blade having a first and a second side, said blade being removably secured to said first extremity of said adapter device;
said first extremity of said body defining a diametrical slot disposed between said flutes for the replaceable reception therein of said blade such that coolant flowing through said first branch bore is directed towards said first side of said blade and coolant flowing through said second branch bore is directed towards said second side of said blade;
said distal end of said holder defines a channel;
said second extremity of said body defines a diametrically extending ridge for the removable reception thereof within said channel defined by the distal end of said holder such that in use of said adapter device, when said holder is rotated, said ridge and said channel cooperate to drive said body and said blade secured thereto;
said body includes:
an extension of truncated conical configuration, said extension extending away from said ridge;
a chamber extending from said channel for the removable reception therein of said extension; and
a locking fastener adjustably movable through said holder towards said truncated conical extension such that when said locking fastener is disposed in a locking disposition thereof, said extension is locked within said bore so that said adapter device is secured to said distal end of said holder.

8. An adapter device as set forth in claim 1 wherein said body includes:
an extension which extends away from said second extremity of said body, said extension being removably fastened to the holder.

9. An adapter device as set forth in claim 1 wherein said diametrical slot includes:
a base having a first and a second end;
said slot having a first and a second wall;
said first wall defining a first threaded bore;
a fastener extending through the blade and threadably cooperating with said first threaded bore for removably securing the blade within said slot;
said second wall defining a second threaded bore;
a further fastener extending through the blade and threadably cooperating with said second threaded bore for removably securing the blade within said slot.

10. An adapter device as set forth in claim 9 wherein said body further includes:
a stud disposed between said first and second ends of said base, said stud extending into a recess defined by the blade for locating the blade relative to said adapter device.

11. An adapter device as set forth in claim 1 wherein said first extremity of said body defines a first surface where said first branch bore terminates;
said first extremity of said body defines a second surface where said second branch bore terminates.

12. A spade drill apparatus comprising:
a holder having a distal end;
an adapter device including:
a body of generally cylindrical configuration, said body having a first and a second extremity, said body defining a first flute and a second flute disposed diametrically opposite to said first flute, said body also defining a bore which extends from said second extremity of said body for the flow therethrough of coolant, said body further defining a first and a second branch bore, said branch bores extending from said bore to said first extremity of said body;
said second extremity of said adapter device removably cooperating with said distal end of said holder;
a blade having a first and a second side, said blade being removably secured to said first extremity of said adapter device;

said first extremity of said body defining a diametrical slot disposed between said flutes for the replaceable reception therein of said blade such that coolant flowing through said first branch bore is directed towards said first side of said blade and coolant flowing through said second branch bore is directed towards said second side of the blade;

said second extremity of said body defines a diametrically extending ridge:

an extension extending away from said ridge;

the distal end of the holder defining a channel and a chamber for the removable reception therein of said ridge and said extension respectively; and a fastener for fastening said extension within said chamber such that in use of said adapter device, when the holder is rotated, said ridge and said channel cooperate with each other to drive said body and the blade secured thereto.

* * * * *